July 12, 1927.
J. B. CARROLL
1,635,174
THERMOMETER OR THERMOMETER TUBE SUPPORT
Original Filed Oct. 20, 1924
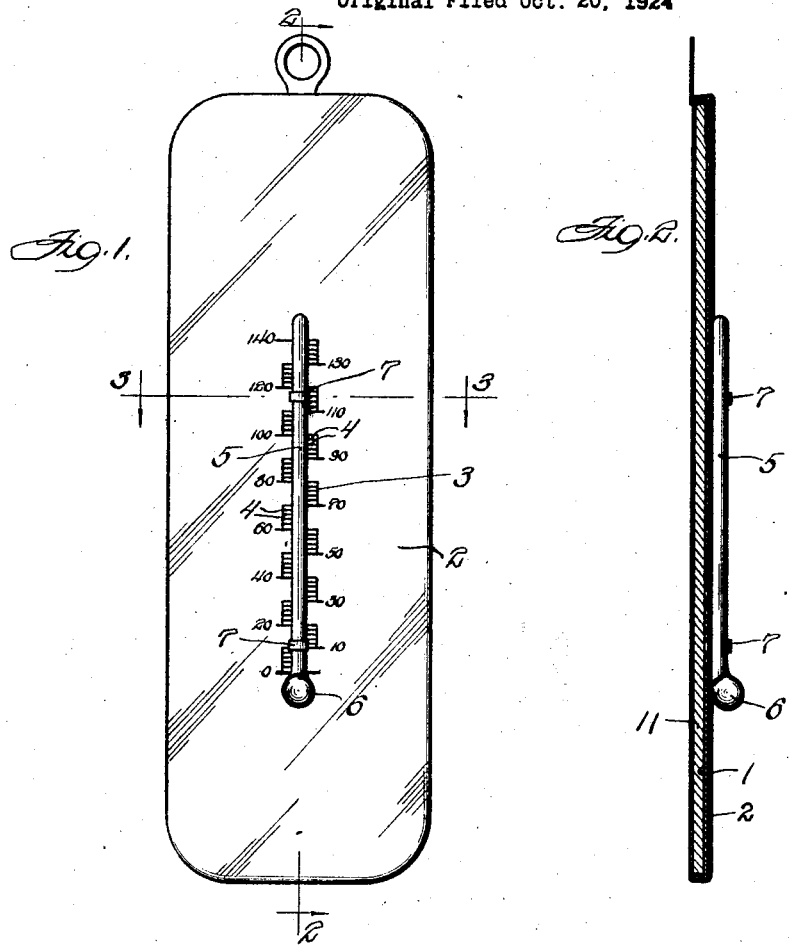
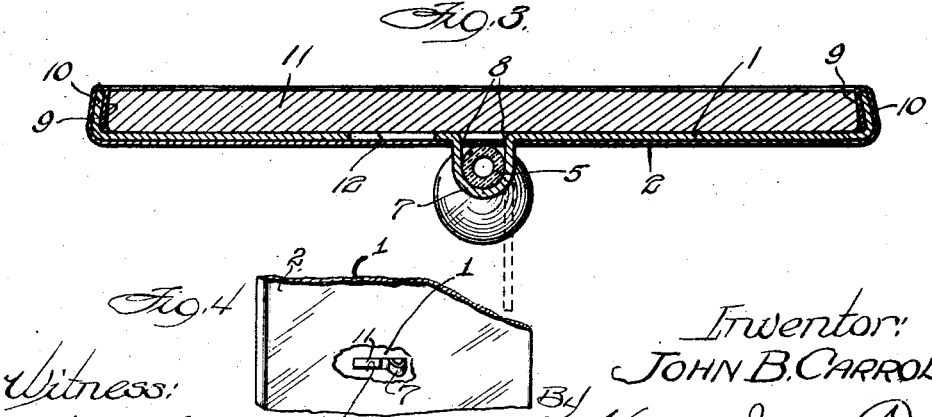
Inventor:
JOHN B. CARROLL Patented July 12, 1927.

1,635,174

UNITED STATES PATENT OFFICE.

JOHN B. CARROLL, OF OAK PARK, ILLINOIS.

THERMOMETER OR THERMOMETER-TUBE SUPPORT.

Application filed October 20, 1924, Serial No. 744,667. Renewed May 13, 1927.

This invention relates to improvements in thermometers, or thermometer tube supports comprising a backing plate or sheet provided with means for supporting a thermometer tube in operative position.

The principal object of the invention is to provide a simple, economical and efficient thermometer, or thermometer tube support.

Other and further objects of the invention will appear from the following description and claims, and from an inspection of the accompanying drawings which are made a part hereof.

The invention consists in the features, combinations, and details of construction herein described and claimed.

In the accompanying drawings:—

Figure 1 is a front view in elevation of a thermometer, or thermometer tube and support constructed in accordance with my invention;

Fig. 2 is a view in longitudinal section taken on line 2—2 of Fig. 1, looking in the direction indicated by the arrows and showing a metallic backing plate, a thermometer tube, a face plate or sheet interposed between the tube and metallic backing plate, and means on and integral with the metallic backing plate and extending through the face plate or sheet and in engagement with the thermometer tube, for supporting the tube in operative position;

Fig. 3 is an enlarged view in transverse section, taken on line 3—3 of Fig. 2, looking in the direction indicated by the arrows; and Fig. 4 is an enlarged detail view in perspective partly in section, with parts broken away, showing the construction and arrangement of the tube-engaging loops integral with the backing plate.

In constructing a thermometer, or thermometer-tube support, adapted to support a thermometer-tube in accordance with my invention, I provide a tube-supporting backing plate or member 1, which is, by preference, formed of sheet metal, or other similar or suitable material. Mounted on the front face of the tube-supporting backing member, sheet or plate 1 is a facing sheet or face plate 2, formed, by preference, of celluloid, or of similar or other suitable material. The facing sheet or plate 2 is provided on its outer face with an ordinary thermometer scale 3, having suitable graduations or scale marks 4, which are, by preference, numbered in the usual or any desired ordinary and well known manner. The graduations or scale marks forming the scale 3, here shown, are arranged in groups which are, by preference, located on opposite sides of a thermometer tube 5, which may be of any desired ordinary and well known or suitable form. The thermometer tube here shown is a glass tube, which is provided with a bulb 6 at its bottom extremity adapted to contain mercury, or other suitable material which will expand and rise in the tube as the temperature rises, and contract and move downward in the tube and with respect to the graduations or scale marks as the temperature falls. The scale marks or graduations may, of course, be either on the tube, or adjacent thereto, as desired, and may be of any desired ordinary and well known or suitable form.

The facing sheet or face plate 2, which is interposed between the thermometer tube 5 and the backing member or sheet 1 covers the backing sheet and forms a relatively non-conductive element between the tube and metallic backing sheet or member.

The tube-supporting backing member, sheet or plate 1, which is, by preference, formed of sheet metal, is provided with one or more tube-engaging securing members or loops 7, which are, by preference, in the form of flexible metallic loops, staples or fingers formed in one integral piece with the metallic tube-supporting member or backing plate 1, and extend through suitable perforations 8 in the facing sheet 2, and over and, by preference, around and in snugly fitting engagement with the thermometer tube 5, which is thus rigidly supported in upright position against the front face of the facing sheet or plate 2, and in the desired predetermined position with respect to the thermometer scale or graduations 4.

The outer margins 9 of the facing sheet or plate 2 are folded over the corresponding or adjacent edges or margins 10 of the metallic backing plate or sheet 1. And the margins 9 and 10 are folded back, or bent backward and inward so that the margin 10 of the backing sheet 1 is back of the main body of said backing sheet, and the extreme outer margins 9 of the facing sheet or plate overlap the corresponding or adjacent margins 10 of the backing sheet 1, and, by preference, extend between said margins 10 and the adjacent edge or margin of a reinforcing plate or sheet 11, which may be of cardboard, fiber board, paste board, or other suitable material. The reinforcing sheet or plate 11 is of suitable shape and dimensions so that its side and end margins fit snugly in engagement with the overlapping flanges or folded margins 9 and 10 by which the corresponding margins of the reinforcing member 11 are covered and enclosed. The reinforcing plate or sheet 11 thus serves to reinforce and strengthen the relatively thin metallic backing member or sheet 1 and facing sheet 2, in the usual manner, and the article as a whole is given a finished and attractive appearance.

The metallic backing plate or sheet 1 is, by preference, cut or stamped from sheet metal, so as to form a blank, having the tube-engaging securing members or loops 7 formed in one integral piece with the body portion of said backing plate or sheet 1. The tube-engaging securing members or loops 7 are thus formed by cutting a notch 12 for each loop formed on the backing member or sheet 1, and by bending each loop or tube-engaging securing member 7 outward from its notch 12 into position to be readily inserted through or to form suitable perforations 8 in the facing sheet or plate 2. The projecting fingers or loops 7, having been inserted through the facing plate or sheet 2, and the thermometer tube being placed in position on the front face of the facing sheet or plate 2, which is thus interposed between the tube and the metallic backing member 1, it is only necessary to bend the fingers or loop members 7 over and around the thermometer tube in position to securely and firmly hold the tube in operative position, with the loop or loops 7 in engagement with the tube, and in engagement with the facing sheet or plate 2 on both sides of the tube.

While one end of each bent loop or finger 7 is integral with the plate 1, the opposite end which is bent around the tube, extends into and between the marginal walls or edges of the slot 12, and is securely held in place in engagement with the slot or slotted portion of the plate 1.

I claim:

1. A thermometer-tube support comprising a metallic backing member and a facing sheet, said metallic backing member having a flexible tube-engaging loop formed in one integral piece with said metallic backing member, said flexible loop having an end portion adapted to be inserted through an opening in said facing sheet and folded over a thermometer tube to be secured in operative position on the outside of the facing sheet.

2. A thermometer-tube support comprising a metallic backing member and a facing sheet on said backing member, said metallic backing member having a plurality of flexible loop portions formed in one integral piece with said metallic backing member, each of said flexible loop portions having a projecting end adapted to be inserted through an opening in said facing sheet and bent over a thermometer tube located on the outside of the facing sheet.

3. In a device of the class described, the combination of a thermometer tube, a backing sheet, a facing sheet interposed between said thermometer tube and said backing sheet, said backing sheet having a plurality of flexible loops formed in one integral piece with said backing sheet, each of said loops having a projecting portion extending through an opening in said facing sheet and in engagement with said tube.

4. In a device of the class described, the combination of a thermometer tube, a metallic backing sheet, a facing sheet interposed between said thermometer and said backing sheet, said backing sheet having a plurality of flexible loops each formed in one integral piece with said backing sheet, each of said loops having a projecting end portion adapted to be inserted through an opening in said facing sheet and foldable over and in securing engagement with the thermometer tube.

Signed at Chicago, in the county of Cook and State of Illinois, this 8th day of October, 1924.

JOHN B. CARROLL.